(12) United States Patent
Zhu et al.

(10) Patent No.: US 10,581,997 B2
(45) Date of Patent: Mar. 3, 2020

(54) TECHNIQUES FOR STORING OR ACCESSING A KEY-VALUE ITEM

(71) Applicant: INTEL CORPORATION, Santa Clara, CA (US)

(72) Inventors: Shunyu Zhu, Beijing (CN); Xiangbin Wu, Beijing (CN); Zhiyuan Zhang, Beijing (CN); Xinxin Zhang, Beijing (CN); Qianying Zhu, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 183 days.

(21) Appl. No.: 15/549,146

(22) PCT Filed: Mar. 5, 2015

(86) PCT No.: PCT/CN2015/073682
§ 371 (c)(1),
(2) Date: Aug. 4, 2017

(87) PCT Pub. No.: WO2016/138657
PCT Pub. Date: Sep. 9, 2016

(65) Prior Publication Data
US 2018/0048732 A1    Feb. 15, 2018

(51) Int. Cl.
*G06F 13/00* (2006.01)
*H04L 29/08* (2006.01)
(Continued)

(52) U.S. Cl.
CPC ........ *H04L 67/2842* (2013.01); *G06F 16/213* (2019.01); *G06F 16/2228* (2019.01); *G06F 16/986* (2019.01); *H04L 67/1097* (2013.01)

(58) Field of Classification Search
CPC .. G06F 16/213; G06F 16/2228; G06F 16/986; G06F 67/2842; G06F 67/1097; H04L 67/2842; H04L 67/1097
(Continued)

(56) References Cited

U.S. PATENT DOCUMENTS 9,465,770 B2 * 10/2016 Guerin ................. G06F 15/167
9,727,523 B2 *  8/2017 Aslam ................. H04L 67/1097
(Continued)

FOREIGN PATENT DOCUMENTS

| CN | 102073690 A | 5/2011 |
|---|---|---|
| CN | 102917036 A | 2/2013 |
| CN | 103166997 A | 6/2013 |

OTHER PUBLICATIONS

Zong, Xiaozhong, "Web Caching Server Built on Memcached," Computer Knowledge and Technologe, vol. 7, No. 5, Feb. 28, 2011, pp. 1044-1045.
(Continued)

*Primary Examiner* — Kenneth R Coulter

(57) ABSTRACT

Examples may include techniques for storing or accessing a key-value (KV) item stored in a memory that is part of a memcached system. A KV server coupled with a network input/output device may be capable of allocating one or more item slots from the memory and indicating to logic or features of the network input/output device whether the KV item is stored in a single allocated item slot of the memory, accessible via multiple allocated item slots of the memory or whether the KV item is being updated.

29 Claims, 11 Drawing Sheets

Data Structure 300

(51) Int. Cl.
    *G06F 16/958*    (2019.01)
    *G06F 16/21*     (2019.01)
    *G06F 16/22*     (2019.01)

(58) Field of Classification Search
    USPC ................................................ 709/203, 245
    See application file for complete search history.

(56) References Cited

U.S. PATENT DOCUMENTS

| | | | |
|---|---|---|---|
| 9,727,524 B2* | 8/2017 | Aslam | H04L 67/1097 |
| 9,934,248 B2* | 4/2018 | Ukai | G06F 16/183 |
| 2014/0279944 A1* | 9/2014 | Ghandeharizadeh | G06F 16/2365 |
| | | | 707/690 |
| 2016/0012075 A1* | 1/2016 | Ukai | G06F 16/183 |
| | | | 707/827 |
| 2016/0119422 A1* | 4/2016 | Aslam | H04L 67/1097 |
| | | | 709/212 |
| 2016/0210263 A1* | 7/2016 | Guerin | G06F 15/167 |

OTHER PUBLICATIONS

International Search Report dated Dec. 15, 2015 for International Patent Application No. PCT/CN2015/073682.

\* cited by examiner

| Memory 200 ||
|---|---|
| Key | Item Slot Allocation (64 bytes) |
| 210-1 | Data 212-1 |
| 210-2 | Data 212-2A |
| | Data 212-2B |
| 210-3 | Data 212-3 |
| 210-4 | Data 212-4A |
| | Data 212-4B |
| | Data 212-4C |
| | Data 212-4D |
| 210-5 | Data 212-5 |
| ... | ... |
| 210-p | Data 212-p |
| | |
| 210-p | Data 212-1 |

*FIG. 2*

Storage Medium 700

Computer Executable Instructions for 800

*FIG. 7*

Storage Medium _1000_

*Computer Executable Instructions for 900*

FIG. 10

TECHNIQUES FOR STORING OR ACCESSING A KEY-VALUE ITEM

CROSS-REFERENCE TO RELATED APPLICATION

This application is a national phase claiming the benefit of and priority to International Patent Application No. PCT/CN2015/073682, entitled "TECHNIQUES FOR STORING OR ACCESSING KEY-VALUE ITEM", filed Mar. 5, 2015, which is hereby incorporated by reference it its entirety.

TECHNICAL FIELD

Examples described herein are generally related to memcached systems having a key-value server.

BACKGROUND

In computing, memcached is a general-purpose distributed memory caching system. Memcached systems may be used to speed up dynamic database-driven websites by caching data and objects in random access memory (RAM) to reduce a number of times an external data source (such as a database) needs to be accessed or read. Most memcached systems use a client-server architecture that may include multiple clients and servers. The servers may be referred to as "key-value (KV) servers". KV servers may maintain a KV associated array that may be populated by clients and these clients may also query the KV associated array. Clients use client-side libraries to contact servers. Each client knows all servers; the servers typically do not communicate with each other. If a client wishes to set (e.g., cache/store) or read a value corresponding to a certain key, the client's library first computes a hash of the key to determine the KV server to use. The client may then contact the KV server. In some examples, the KV server may compute a second hash of the key to determine where to store or read the corresponding value or KV item. Typically, KV servers maintain KV items in a memory such as RAM and as the RAM reaches capacity, oldest KV items are discarded or overwritten.

BRIEF DESCRIPTION OF THE DRAWINGS

FIG. 2 illustrates an example memory.
FIG. 7 illustrates an example of a first storage medium.
FIG. 10 illustrates an example of a second storage medium.

DETAILED DESCRIPTION

Figure 1:
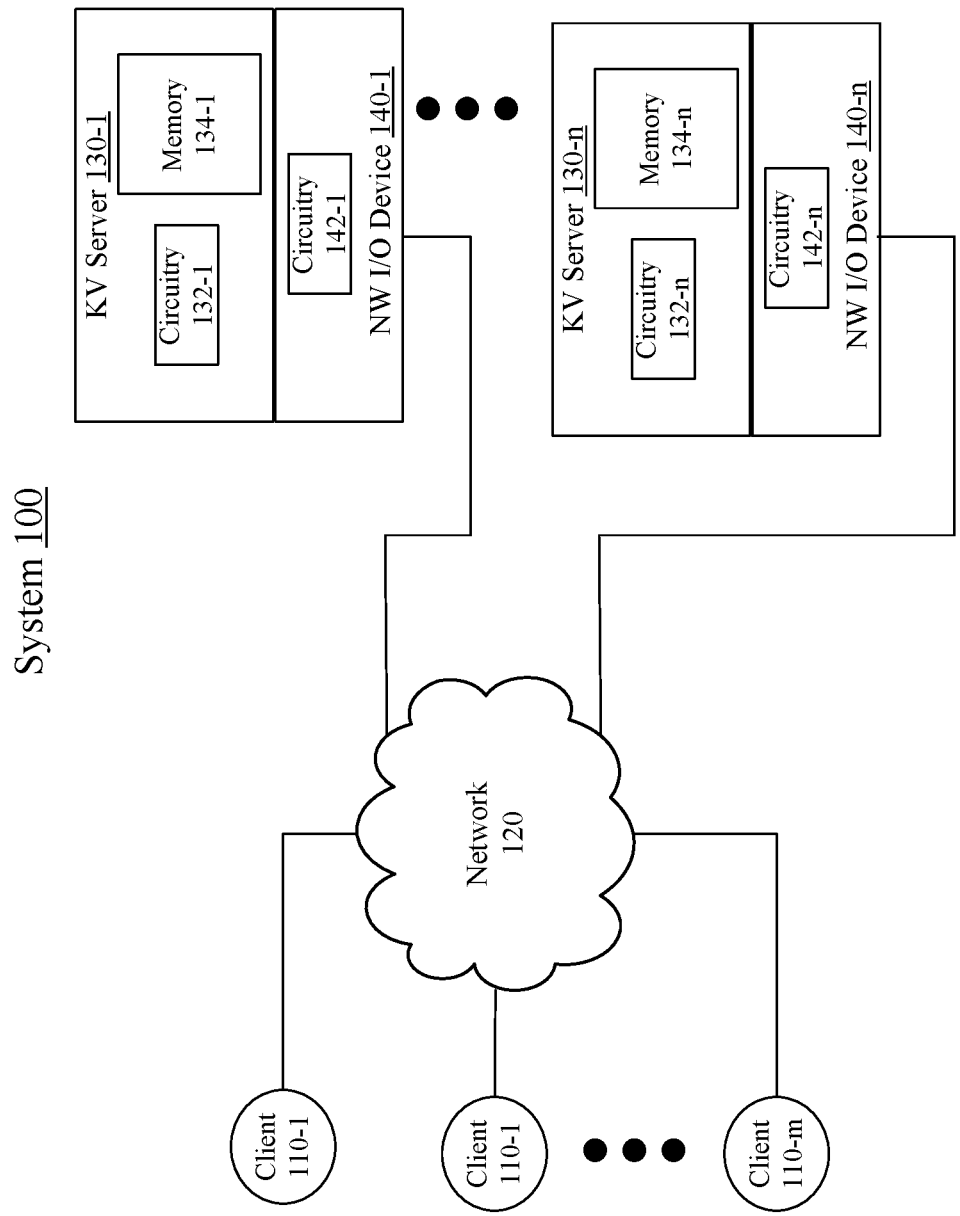
FIG. 1 illustrates an example system.

As mentioned previously, a client may contact a KV server and the KV server may compute a second hash of the key to determine where to store or read the corresponding value or KV item. For large web applications, e.g., web applications with millions of users, hundreds of KV servers may be necessary to timely service SET, GET or Update operation commands that may be associated with page requests for these millions of users. Often, to meet business requirements, a service operator for these web applications not only needs to provide a total memory size as large as possible to meet possible service level agreements (SLAs), but also needs a substantial amount of processing power to handle millions of SET, GET or Update operation commands with in SLA dictated time limits.

Some memcached systems may be designed such that a substantial amount of processing power or central processor unit (CPU) involvement is needed at each KV server to handle large numbers of SET, GET or Update operation commands and still meet SLAs. As a result of high CPU involvement, each KV server may not fully utilize a physical capacity of a memory maintained at and/or accessible to each KV server. Instead, service operators may need to spread processing workloads across multiple KV servers to meet SLAs. This leads to at least two problems: 1) poor memory bandwidth usage: and 2) poor scalability. Also, due to high CPU, each memory access may be energy intensive. Poor power efficiency per KV item access or storage operation may then result and this may unacceptable raise operating costs for service operators A solution to reduce CPU involvement for each KV item access or storage operation involves use of an Ethernet interface arranged to support a customized Ethernet remote direct memory access (RDMA) protocol to enable a client to access or store each key item. For this solution, the client may be capable of caching key item RDMA information locally to speedup Key to RDMA information lookup and therefore reduce CPU involvement at the KV server. These local caches at the client may use a TCP/IP protocol that includes a TCP/IP KV GET protocol to acquire key item RDMA information from the KV server. The RDMA protocol, for example, may be based, at least in part, on industry standards such as the Internet Wide Area RDMA protocol (iWARP), Infiniband (IB) protocol, Ethernet protocol, Transmission Control Protocol/Internet Protocol (TCP/IP) protocol and/or RDMA over Converged Ethernet (RoCE) protocol. Also for example, the Ethernet protocol may comply and/or be compatible with Institute of Electrical and Electronics Engineers, Inc. (IEEE) Std. 802.3-2008, Dec. 26, 2008. Additionally, for example, the TCP/IP protocol may comply and/or be compatible with the protocols described in Internet Engineering Task Force (IETF) Request For Comments (RFC) 791 and 793, published September 1981.

The above-mentioned solution may significantly reduce CPU involvement for each KV item access or storing operation at a KV server. However, any updates to a given KV item already stored at the KV server may require complicated cache synchronization. Also, the client may have to fall back to the pre-solution access methods that require extensive CPU involvement while a complicated cache synchronization process occurs. It is with respect to these challenges that the examples described herein are needed.

According to some first examples, techniques for storing or accessing a KV item may include receiving, at a KV server for a memcached system, an operation command for storing a KV item to a memory maintained at the KV server. The techniques may also include allocating one or more item slots from the memory to access and store the KV item. For these first examples, a first item slot of the one or more item slots may include an indicator flag capable of indicating whether the KV item is stored in the first item slot or whether the KV item is being updated. The techniques may also include setting the indicator flag to indicate whether the KV item is stored in the first item slot.

In some second examples, techniques for storing or accessing a KV item may include receiving, at a network input/output (NW I/O) device coupled with a key-value (KV) server for a memcached system, an operation command to get a KV item stored in a memory maintained at the KV server. The techniques may also include sending an RDMA read request to the memory to read a first item slot allocated by the KV server to access and store the KV item. For these second examples, the first item slot may include an indicator flag capable of indicating whether the KV item is stored in the first item slot or whether the KV item is being updated. The techniques may also include determining whether the indicator flag indicates the KV item is stored in the first item slot or is being updated and sending a second RDMA read request after a time interval or reading the stored KV item based on the determination.

FIG. 1 illustrates an example system 100. In some examples, as shown in FIG. 1, system 100 includes clients 110-1 to 110-$m$ (where "m" is any positive whole integer>2) coupled to key-value (KV) servers 130-1 to 130-$n$ (where "n" is any positive whole integer>1) through a network 120. Also as shown in FIG. 1, NW I/O devices 140-1 to 140-$n$ may respectively couple to KV servers 130-1 and 130-$n$. As described more below, clients 110-1 to 110-$m$, network 120, KV servers 130-1 to 130-$n$ and NW I/O devices 140-1 may be part of a memcached system. As part of a memcached system, logic or features at KV servers such as KV servers 130-1 to 130-$n$ (e.g., included in circuitry 132-1) or at NW I/O device 140-1 to 140-$n$ (e.g., included in circuitry 142-1) may be capable of enabling clients 110-1 to 110-$m$ to execute TCP/IP KV SET (store), GET (access) or UPDATE (update) protocol or command operations to store, access or update KV items in memory. The memory may include memory maintained at KV servers 134-1 to 134-2 such as memory 134-1 or memory 134-2.

According to some examples, memory 134-1 to 134-$n$ may include, but are not limited to, RAM types of memory maintained at respective KV servers 130-1 to 132-$n$. For example, one or more dual in-line memory modules (DIMMS) including RAM types of memory may be included in memory 134-1 to 134-$n$. Also, circuitry 142-1 to 142-$n$ may be capable of mapping physical addresses of memory 134-1 to 134-$n$ into an address space of a memcached system for clients 110-1 to 110-$m$ to store, access or update KV items to these memories maintained at either KV server 1301 to 132-$n$. As described more below, mapped physical address may be capable of being allocated to item slots to facilitate accessing or storing of a KV item.

In some examples, computing devices 110-1 to 110-$m$ may represent a broad range of computing devices including but not limited to, smartphones, computing tablets, ultrabooks, laptops, smartwatches, portable media players, wearable computing devices, desktop computers or workstation. Also, KV servers 130-1 to 130-$n$ may also represent a broad range of computing devices that may be managed by service providers for database-driven websites such as those associated with social media websites, photo sharing websites, user generated and shared video websites or other types of database-driven websites.

FIG. 2 illustrates an example memory 200. As shown in FIG. 2, memory 200 includes keys 210-1 to 210-$p$, where "p" is any positive whole integer>5. Also, as shown in FIG. 2, one or more item slots of 64 bytes may be allocated to each key used to SET, UPDATE or GET a value or KV item accessible to a client capable of using or accessing a memcached system. For example, key 210-1 may have a single allocated item slot capable of storing data 212-1, while key 210-4 may have multiple allocated item slots capable of storing data 212-4A through 212-4D. Allocation of item slots may occur responsive to logic or features at a KV server such as KV server 130-1 receiving a SET operation command for storing a KV item to a memory maintained at the KV server. In this case, the memory may be arranged similar to memory 200 and the KV item may be stored to one or more allocated item slots. In some examples, depending on the size of data needed to store the KV item, one or more item slots may be allocated.

According to some examples, as described more below, at least a first allocated item slot may include an indicator flag and if the indicator flag and the KV item do not exceed a size of 64 bytes, the data associated with a first given allocated first item slot may include both the indicator flag and the KV item. Therefore, a single item slot may be allocated to store and to later access the KV item. For example, key 210-1 may be associated with a KV item that along with an indicator flag does not exceed 64 bytes. Thus, for this example, data 212-1 may include both an indicator flag and the KV item. However, if the indicator flag and the KV item exceed a size of 64 bytes, the data associated with a second given allocated first item slot may include the indicator flag and a memory pointer to a memory address for one or more additional item slots allocated to store the KV item. For example, key 210-4 may be associated with a KV item that along with the indicator flag exceeds the size of 64 bytes. Therefore, in an example where the KV item had a size of up to 192 bytes, data 212-4A may include the indicator flag and a memory pointer to access the KV item stored with three additional allocated item slots including data 212-4B, 212-4C and 212-4D.

Examples are not limited to an item slot size of 64 bytes. Other item slot sizes may apply. In some examples, an item slot size of 64 bytes may correspond to a cache line size typically associated with applications or software designed to be executed by CPUs arranged to execute x86 instructions sets such as CPU designed by Intel® Corporation or AMD®.

Also, as described more below, an indicator flag included in a first allocated item slot may serve a dual function. The first function may indicate whether the KV item associated with this first allocated given item slot is stored in the first allocated item slot. The second function may indicate whether the KV item is being updated.

Figure 3:
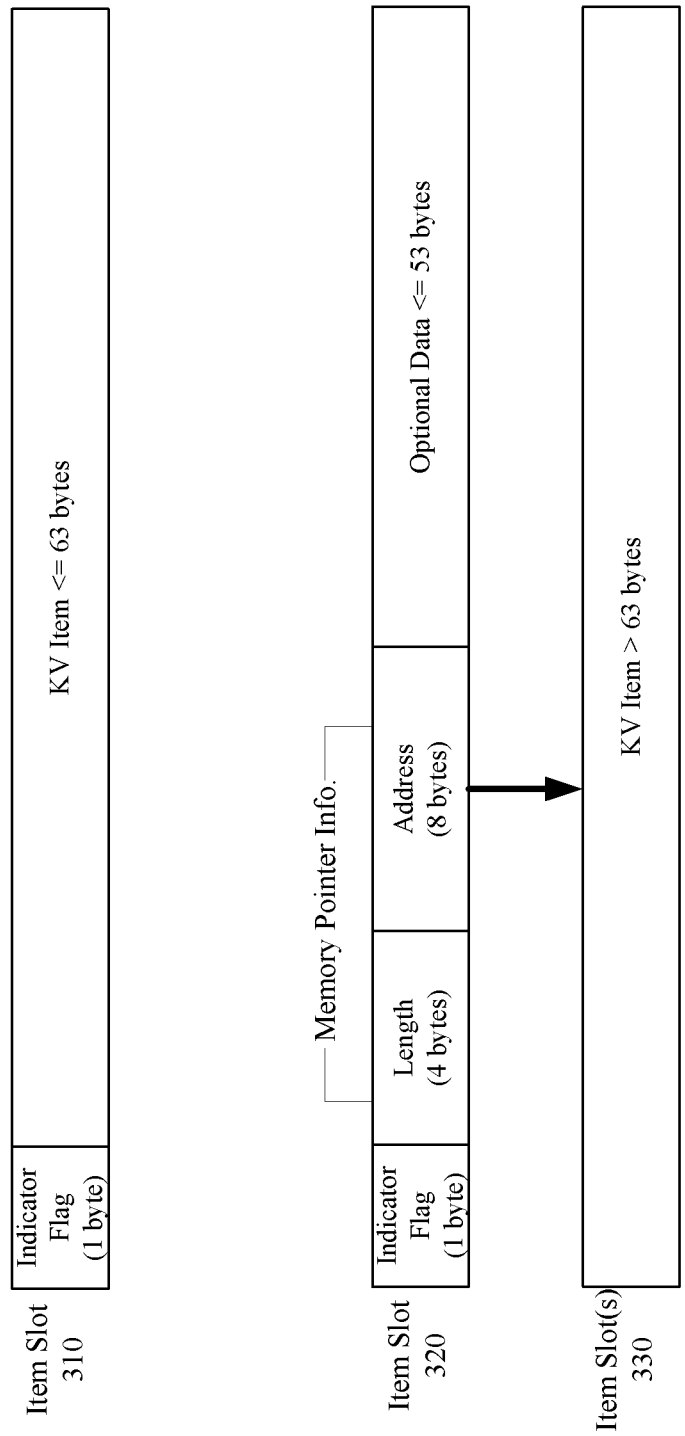
FIG. 3 illustrates an example data structure.

FIG. 3 illustrates an example data structure 300. In some examples, as shown in FIG. 3, data structure 300 shows an example of how data associated with accessing or storing a KV item from a memory included in a memcached system may be arranged. In a first example, item slot 310 shows how an indicator flag having a data size of up to 1 byte and a KV item having a data size of less than or equal to 63 bytes may be included in a single item slot.

In a second example, item slot 320 shows how an indicator flag of 1 byte and memory pointer information of 12 bytes may be included in a first item slot. As shown in FIG. 3, memory pointer information may include length data of up to 4 bytes and an address of up to 8 bytes. For this second example, a given KV item may have a data size of greater than 63 bytes and one or more additional item slot(s) 330 may be allocated to store the KV item to the memory included in the memcached system. The address information as well as the length information may be used by logic or features at a NW I/O device coupled to a KV server maintaining the memory. The logic or features at the NW I/O device may use the address and length information to perform a DMA read request to the memory in order to complete, for example, a TCP/IP KV GET operation command sent by a client having access to the memcached system. Also, as shown in FIG. 3 for item 320, optional data equal to or less than 53 bytes may be included in item slot. The optional data, for example, may be a portion of the KV item that may be stored to both item slot 320 and the one or more additional item slot(s) 330.

Figure 4:
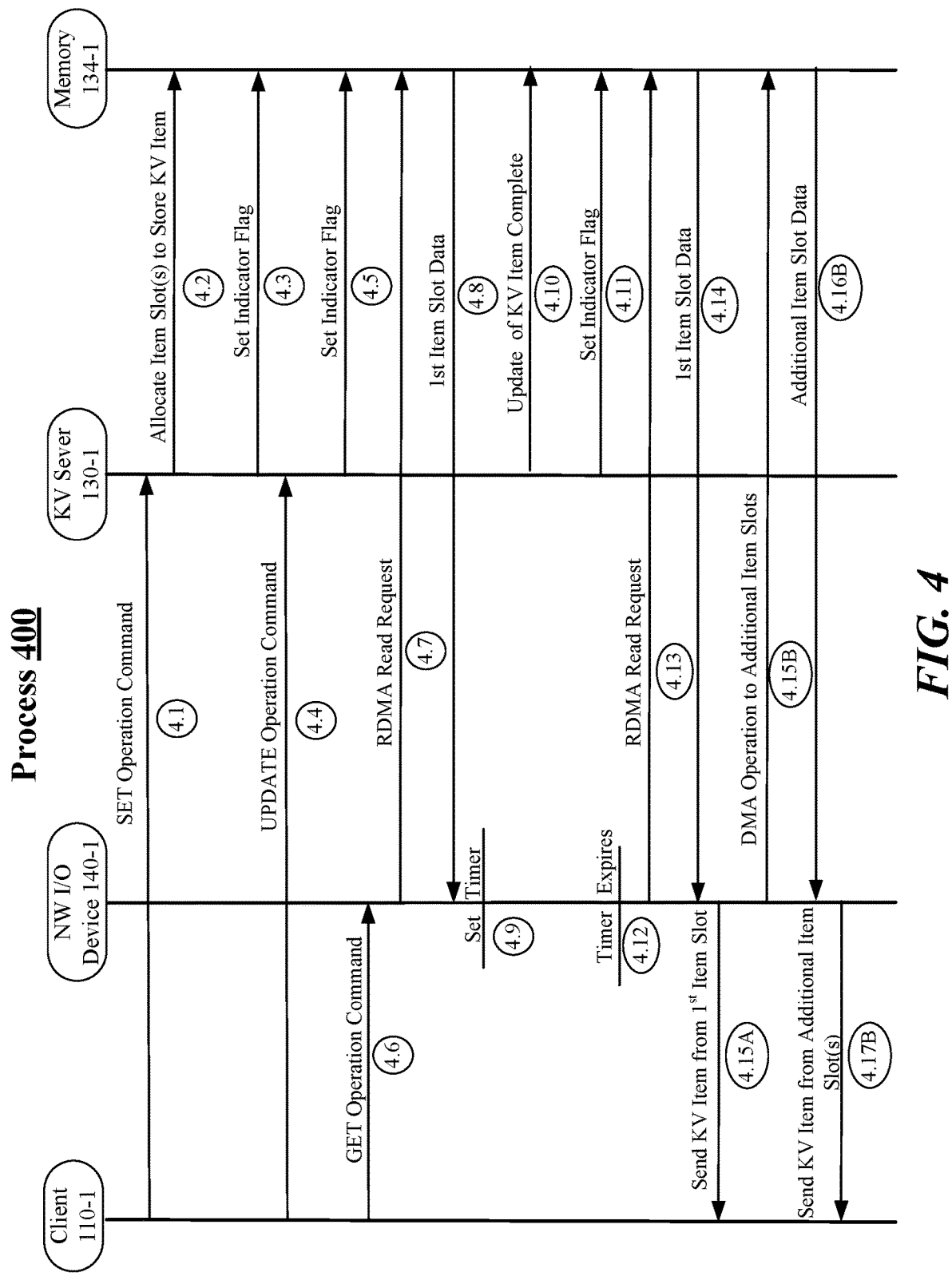
FIG. 4 illustrates an example process.

FIG. 4 illustrates an example process 400. According to some examples, process 400 may demonstrate how different elements of system 100 may implement techniques for storing, accessing or updating a KV item for a memory maintained at a KV server. For these examples, at least some components of system 100 shown in FIG. 1 may be related to process 400. In particular, as shown in FIG. 4, client 110-1, NW I/O device 140-1, KV server 130-1 and memory 134-1. Also item slot allocations similar to those shown in and described for FIG. 2 as well as a data structure similar to data structure 300 shown in and described for FIG. 3 may be related to process 400. However, the example process 400 is not limited to implementations using elements of system 100, memory 200 or data structure 300 shown or described in FIGS. 1, 2 and 3, respectively.

Starting at process 4.1 (SET Operation Command), logic or features at KV server 130-1 may receive a SET operation command from client 110-1 for storing a KV item to memory 134-1 maintained at KV server 130-1. In some examples, the KV item may include data for at least a portion of a database-driven website. For example, a stream video from a social media, photo sharing website or a video sharing website.

Moving to process 4.2 (Allocate Item Slot(s) to Store KV Item), logic or features at KV server 130-1 may allocate one or more item slots from memory 134-1 to enable client 110-1 store the KV item and to enable client 110-1 or other clients to later access the KV item. In some examples, the one or more allocated item slots may map to portion(s) of physical memory addresses for memory 134-1.

Moving to process 4.3 (Set Indicator Flag), logic or features at KV server 130-1 may set an indicator flag to be stored with the one or more allocated item slots. In some examples, the indicator flag may be stored in a first item slot of the one or more allocated item slots. The indicator flag may be capable of indicating whether the KV item is also stored in the first item slot or is being updated. For example, if the indicator flag is set to indicate the KV item is also stored in the first item slot, a hexadecimal value of 0x00 may be set for the indicator flag. If the indicator flag is set to indicate the KV item is not stored in the first item slot, the indicator flag may be set to an example value of 0xee.

Moving to process 4.4 (UPDATE Operation Command), logic or features at KV server 130-1 may receive an UPDATE operation to update the KV item that was stored in memory 134-1 using the one or more allocated slots. According to some examples, the UPDATE operation may include new or modified data that may change data stored in memory 134-1 for the KV item.

Moving to process 4.5 (Set Indicator Flag), logic or features at KV server 130-1 may set the indicator flag to indicate the KV item in memory 134-1 is being updated. As mentioned above, the indicator flag may also be set to indicate whether a KV item is being updated. In some examples, the indicator flag may be set to indicate the KV item is being updated. For these examples, the indicator flag may be set to an example hexadecimal value of 0xff to indicate the updating status for the KV item.

Moving to process 4.6 (GET Operation Command), logic or features at NW I/O device 140-1 may receive a GET operation command from client 110-1 for the KV item that was stored to the one or more allocated slots of memory 134-1. In some examples, client 110-1 may be capable of sending a GET operation command using a TCP/IP KV GET protocol that includes key item RDMA information to identify the KV item for which the client wishes to read or access from memory 134-1.

Moving to process 4.7 (RDMA Read Request), logic or features at NW I/O device 140-1 may be capable of executing or implementing an RDMA read request to memory 134-1 to read the first item slot allocated to the KV item indicated in the received GET operation command.

Moving to process 4.8 ($1^{st}$ Item Slot Data), logic or features at NW I/O device 140-1 may be capable of receiving the first item slot data from memory 134-1. As mentioned above, the indicator flag for this KV item was set at process 4.5 to indicate the KV item was being updated.

Moving to process 4.9 (Set Timer), logic or features at NW I/O device 140-1 may set a timer for a given time interval (e.g., 500 nanoseconds) for which to wait before sending another RDMA read request to memory 134-1.

Moving to process 4.10 (Update of KV Item Complete), logic or features at KV server 130-1 may determine that the update of the KV item is complete. In some examples, updating of the KV item may or may not include allocating additional item slots to store the KV item to memory 134-1.

Moving to process 4.11 (Set Indicator Flag), logic or features at KV server 130-1 may then set the indicator flag to indicate whether the now updated KV item is also stored in the first item slot. In some examples, if a hexadecimal value of 0x00 is set, the KV item is also stored in the first item slot. If a hexadecimal value of 0xee is set, the KV item is stored in or more additional item slots of the one or more allocated item slots.

Moving to process 4.12 (Timer Expires), logic or features at NW I/O device 140-1 may determine that the timer set at process 4.9 has expired.

Moving to process 4.13 (RDMA Read Request), logic or features at NW I/O device 140-1 may send another RDMA request to access the first item slot for the KV item.

Moving to process 4.14 ($1^{st}$ Item Slot Data), logic or features at NW I/O device 140-1 may receive the first item slot data for the KV item. In some examples, the logic or features at NW I/O device 140-1 may first determine whether the indicator flag indicates that the update of the KV item is complete, e.g., no longer has a hexadecimal value of 0xff. The logic or features at NW I/O device 140-1 may then determine whether the indicator flag indicates that the KV item is included in the first item slot.

According to some examples, if the indicator flag still have a hexadecimal value of 0xff, the process may return to 4.9 and the timer may be set again to wait another time interval for the update to be complete. For these examples, the logic or features at NW I/O device 140-1 may continue to wait for the update for a threshold number of RDMA read request retries. If the threshold number of RDMA read request retries is exceeded, the logic or features at NW I/O device 140-1 may send an error message to client 110-1 to indicate that KV item was not able to be read. Process 400 may then come to an end for this error message example.

Moving to process 4.15A (Send KV Item from $1^{st}$ Item Slot), logic or features at NW I/O device 140-1 may have determined that the KV item is included in the first item slot based on the indicator flag having a decimal value of 0x00. In some examples, based on data structure 300, the logic or features at NW I/O device 140-1 may know that data included in the remaining 63 bytes of the first item slot include the KV item. The data included in the remaining 63 bytes is may then be sent to client 110-1 to complete the GET operation command.

Moving to a first alternative at process 4.15B (DMA Operation to Additional Slots), logic or features at NW I/O device 140-1 may have determined that the KV item was not included in the first item slot based on the indicator flag having a decimal value of 0xee. According to some examples, based on data structure 300, the logic or features at NW I/O device 140-1 may know that at least a portion of the remaining 63 bytes of the first item slot include a memory pointer to locate the KV item stored in one or more additional item slots in memory 134-1. Process 400 may then come to an end for this example of the KV item being stored in the first allocated item slot.

Moving to process 4.16B (Additional Item Slot Data), logic or features of NW I/O device 140-1 may use the memory pointer information in the first item slot to determine a location and size of the KV item stored in the one or more additional item slots in memory 134-1. In some examples, the logic or features of NW I/O device 140-1 may use this information to implement a direct memory access (DMA) to read the KV item stored in these one or more additional items slots in memory 134-1.

Moving to process 4.17B (Send KV Item from Additional Item Slot(s)), logic or features at NW I/O device 140-1 may then forward data read from the one or more additional items so send KV item to client 110-1. Process 400 may then come to an end for this example of the KV item being stored in the one or more additional allocated item slots.

Figure 5:
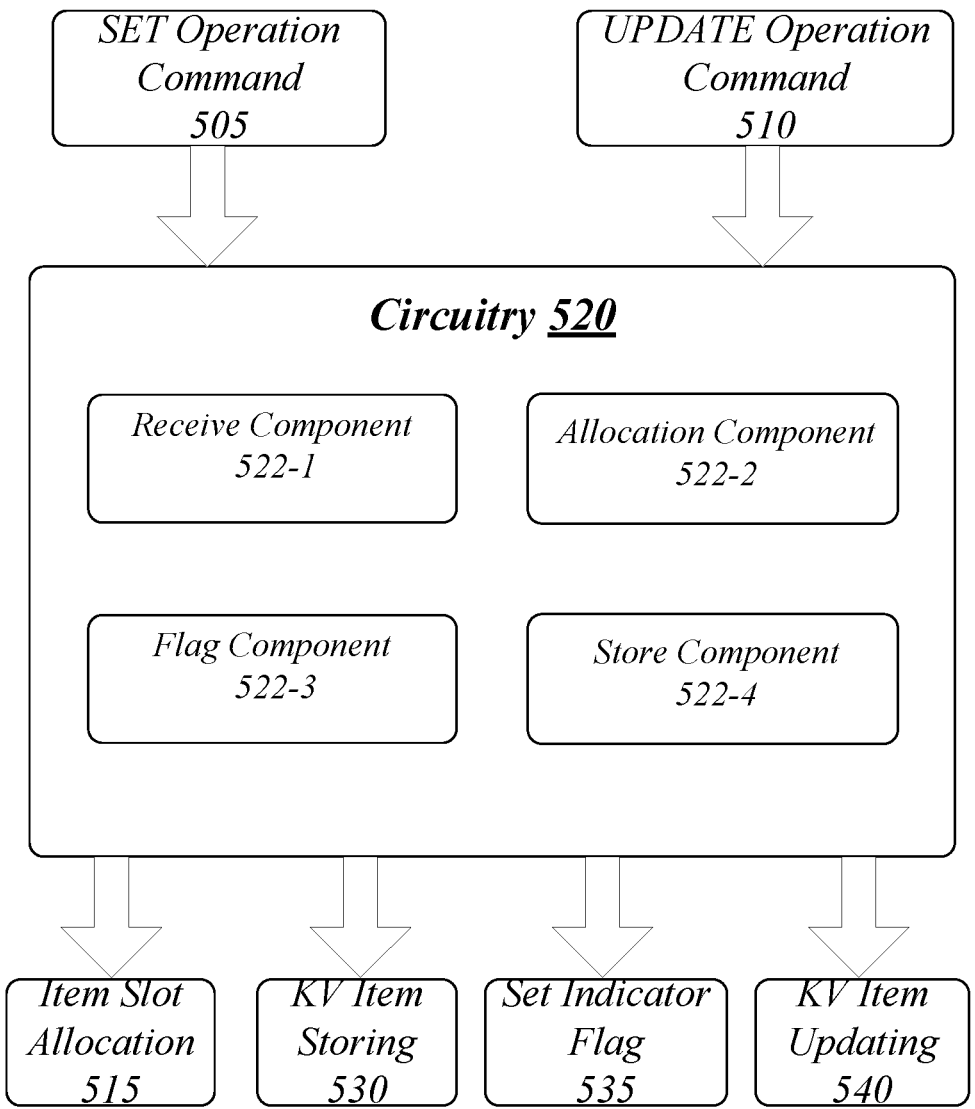
FIG. 5 illustrates an example block diagram for a first apparatus.

FIG. 5 illustrates an example block diagram for a first apparatus. As shown in FIG. 5, the first apparatus includes an apparatus 500. Although apparatus 500 shown in FIG. 5 has a limited number of elements in a certain topology, it may be appreciated that the apparatus 500 may include more or less elements in alternate topologies as desired for a given implementation.

According to some examples, apparatus 500 may be supported by circuitry 520 maintained at a server such as a KV server for a memcached system. Circuitry 520 may be arranged to execute one or more software or firmware implemented modules or components 522-*a*. It is worthy to note that "a" and "b" and "c" and similar designators as used herein are intended to be variables representing any positive integer. Thus, for example, if an implementation sets a value for a=5, then a complete set of software or firmware for components 522-*a* may include components 522-1, 522-2, 522-3, 522-4 or 522-5. The examples presented are not limited in this context and the different variables used throughout may represent the same or different integer values. Also, these "components" may be software/firmware stored in computer-readable media, and although the components are shown in FIG. 5 as discrete boxes, this does not limit these components to storage in distinct computer-readable media components (e.g., a separate memory, etc.).

According to some examples, circuitry 520 may include a processor or processor circuitry. Circuitry 520 may be part of host processor circuitry or may be a CPU at a KV server. Circuitry 520 may be generally arranged to execute one or more software components 522-*a*. Circuitry 520 may be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 520 may also include an application specific integrated circuit (ASIC) and at least some components 522-*a* may be implemented as hardware elements of the ASIC.

In some examples, apparatus 500 may include a receive component 522-1. Receive component 522-1 may be executed by circuitry 520 to receive a SET operation command for storing a KV item to a memory maintained at a KV server that includes or supports apparatus 500. SET operation command 505 may include the received SET operation command as well as the KV item to be stored to the memory.

According to some examples, apparatus 500 may also include an allocation component 522-2. Allocation component 522-2 may be executed by circuitry 520 to allocate one or more item slots from the memory to access and store the KV item, a first item slot of the one or more item slots including an indicator flag capable of indicating whether the KV item is stored in the first item slot or whether the KV item is being updated. Item slot allocation 515 may include those one or more allocated slots to the memory.

In some examples, apparatus 500 may also include a flag component 522-3. Flag component 522-3 may be executed by circuitry 520 to set the indicator flag included in the first item slot of the one or more allocated item slots to indicate whether the KV item is stored in the first item slot or whether the KV item is being updated. For these examples, set indicator flag 535 may include the hexadecimal value to be included in a portion of the first item slot (e.g., the first byte) to indicate whether the KV item is stored in the first item slot or whether the KV item is being updated.

According to some examples, apparatus 500 may also include a store component 522-4. store component 522-4 may be executed by circuitry 520 to cause the indicator flag to be stored to the first item slot. Store component 522-4, depending on the size of the KV item, may then either cause the KV item or a memory pointer to be stored in the first item slot. For these examples, KV item storing 530 may include the data to be stored to the one or more allocated slots. This data included in KV item storing 530 may then be either updated or read responsive to respective UPDATE or GET operation commands.

In some example, apparatus 500 may also include an update component 522-5. Update component 522-5 may be executed by circuitry 520 to cause the KV item in the allocated one or more item slots to be updated. UPDATE operation command including in UPDATE operation command 510 may cause update component 522-5 to update the KV item. Flag component 522-3 may then set the indicator flag in the first item slot to indicate that the KV item is being updated. Following completion of the update of the KV item, flag component 522-3 may set the indicator flag to indicate whether the KV item is stored in the first item slot or is stored in one or more additional item slots.

Various components of apparatus 500 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 6:
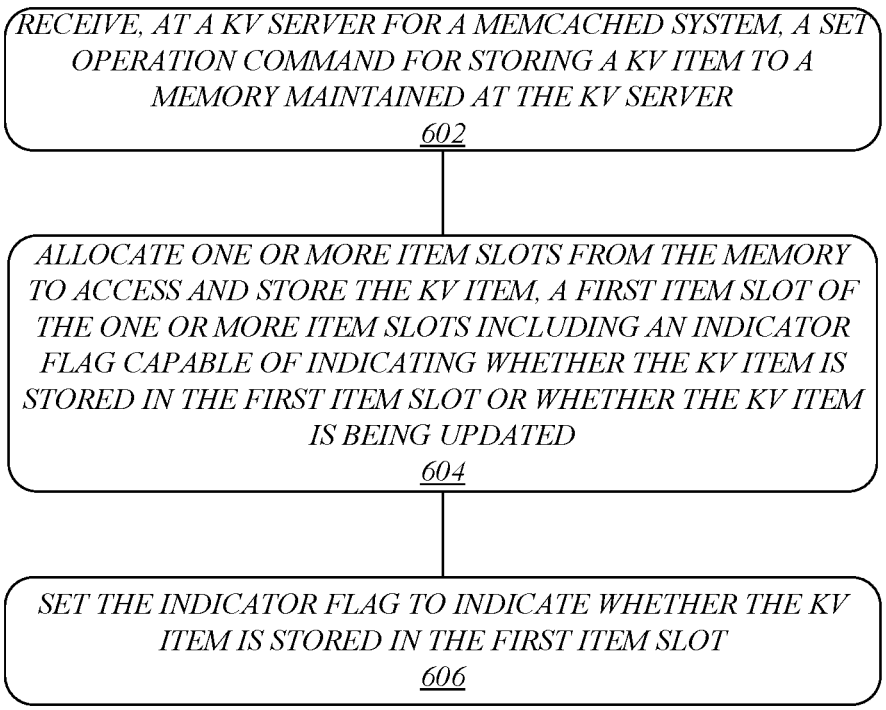
FIG. 6 illustrates an example of a first logic flow.

FIG. 6 illustrates an example of a first logic flow. As shown in FIG. 6 the first logic flow includes a logic flow 600. Logic flow 600 may be representative of some or all of the operations executed by one or more logic, features, or devices described herein, such as apparatus 500. More particularly, logic flow 600 may be implemented by at least receive component 522-1, allocation component 522-2, flag component 522-3, store component 522-4 or update component 522-5.

According to some examples, logic flow 600 at block 602 may receive, at a KV server for a memcached system, a SET operation command for storing a KV item to a memory maintained at the KV server. For these examples, receive component 522-1 may receive the SET operation command.

In some examples, logic flow 600 at block 604 may allocate one or more item slots from the memory to access and store the KV item, a first item slot of the one or more item slots including an indicator flag capable of indicating whether the KV item is stored in the first item slot or whether the KV item is being updated. For these examples, allocate component 522-2 may allocate the one or more item slots.

According to some examples, logic flow 600 at block 606 may set the indicator flag to indicate whether the KV item is stored in the first item slot. For these examples, flag component 522-3 may set the indicator flag.

FIG. 7 illustrates an example of a first storage medium. As shown in FIG. 7, the first storage medium includes a storage medium 700. The storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
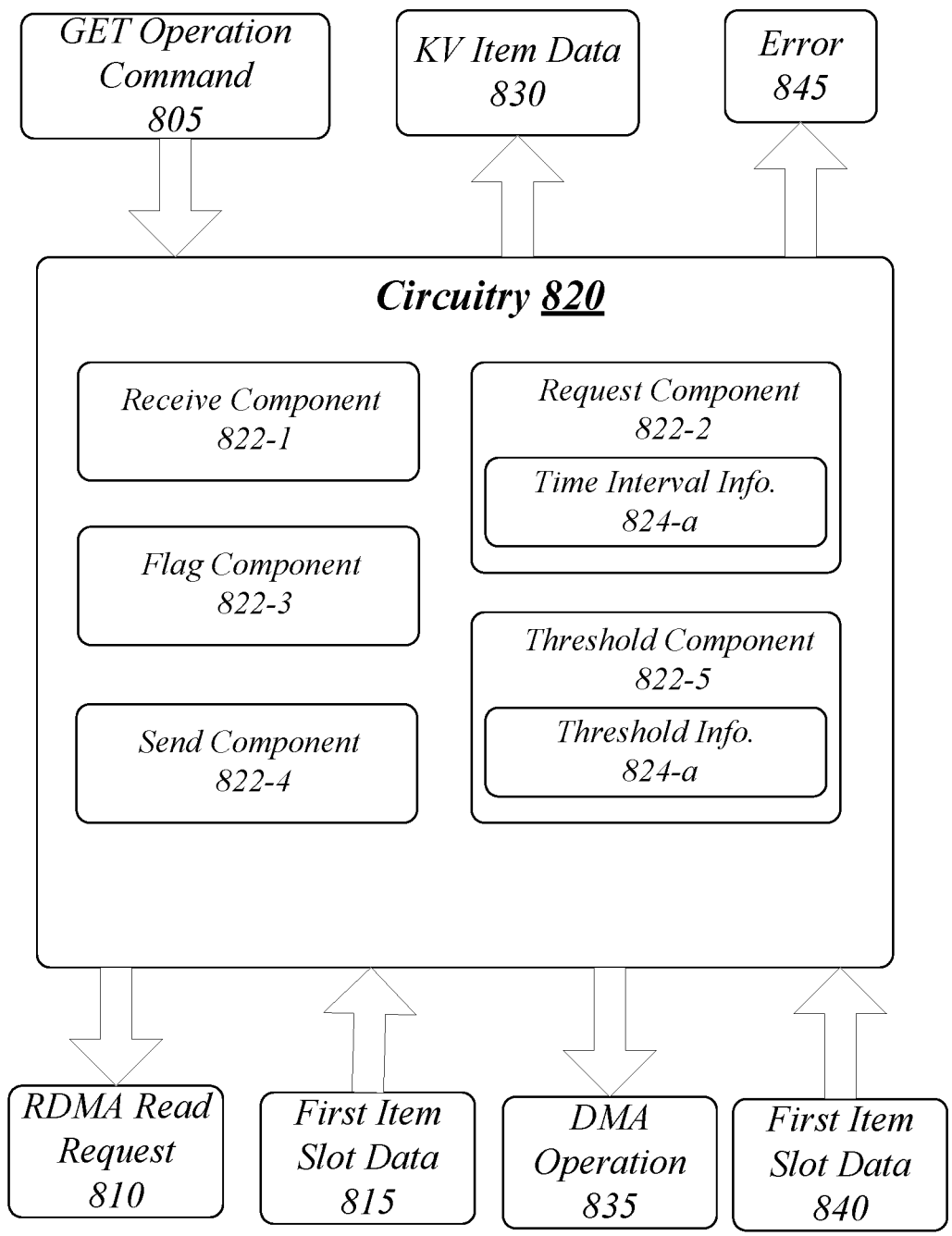
FIG. 8 illustrates an example block diagram for a second apparatus.

FIG. 8 illustrates a block diagram for an example second apparatus. As shown in FIG. 8, the example second apparatus includes apparatus 800. Although apparatus 800 shown in FIG. 8 has a limited number of elements in a certain topology, it may be appreciated that the apparatus 800 may include more or less elements in alternate topologies as desired for a given implementation.

According to some examples, apparatus 800 may be supported by circuitry 820 maintained at a NW I/O device coupled to a KV server for a memcached system. Circuitry 820 arranged to execute one or more software components 822-$a$. It is worthy to note that "a" and "b" and "c" and similar designators as used herein are intended to be variables representing any positive integer. Thus, for example, if an implementation sets a value for a=5, then a complete set of software or firmware for components 522-$a$ may include components 822-1, 822-2, 822-3, 822-4 or 822-5. The examples are not limited in this context.

In some examples, as shown in FIG. 8, apparatus 800 includes circuitry 820. Circuitry 820 may be part the NW I/O device coupled to the KV server. Circuitry 820 may be generally arranged to execute one or more software components 822-$a$. Circuitry 820 may be any of various commercially available processors to include but not limited to the processors mentioned above for apparatus 500. Also, according to some examples, circuitry 820 may also be an ASIC and at least some components 822-$a$ may be implemented as hardware elements of the ASIC.

In some examples, apparatus 800 may include a receive component 822-1. Receive component 822-1 may be executed by circuitry 820 to receive a GET operation command for a KV item stored in a memory maintained at the KV server. The GET operation command, for example, may be included in GET operation command 805.

According to some examples, apparatus 800 may also include a request component 822-2. Request component 822-2 may be executed by circuitry 820 to send an RDMA read request to the memory maintained at the KV server to read a first item slot allocated by the KV server to access and store the KV item. For these examples, the RDMA request may be included in RDMA request 810. Also, for these examples, the first item slot may include an indicator flag capable of indicating whether the KV item is stored in the first item slot or whether the KV item is being updated. If the KV item is not included in the first item slot but is stored in one or more additional item slots, request component 822-2 may use memory pointer information included in the first item slot data 815 and implement a DMA operation 835 to read the KV item stored in the one or more additional slots.

In some examples, apparatus 800 may also include a flag component 822-3. Flag component 822-3 may be executed by circuitry 820 to determine whether the indicator flag indicates the KV item is being updated. Flag component 822-3 may make this determination by reading data included in a first byte of a first item slot allocated to store or access the KV item. For example, this data may be included in first item slot data 815 and a hexadecimal value of 0x00 in this data may indicate that no updating is occurring. A hexadecimal value may also indicate that the KV item is included in the first item slot.

According to some examples, apparatus 800 may also include a send component 822-4. Send component 822-4 may be executed by circuitry 820 to send the KV item stored in either the first item slot or stored in one or more additional allocated item slots. For these examples, KV item data 830 may include the sent KV item that may have been read from either the first item slot or the one or more additional allocated item slots.

In some examples, apparatus 800 may also include a threshold component 822-5. Threshold component 822-5 may be executed by circuitry 820 to compare a total number of additional RDMA read requests being sent to a threshold number. For these examples, threshold component 822-5 may maintain threshold information 824-b (e.g., in a lookup table (LUT)) that includes the threshold number. According to some examples, request component 822-2 may maintain time interval info. 824-a that includes a time interval (e.g., 500 nanoseconds) via which a timer may be set for flag component 822-3 to recheck the indicator flag of a KV item that was previously determined to be in an updating state. For these examples, the threshold number may be established for use as a stopping point for setting the timer after a given number of consecutive times the indicator flag was determined by flag component 822-3 to still indicate the KV item was being updated. Send component 822-4 may then send an error indication to an originator of the GET operation command to indicate the threshold number has been exceeded. The error indication may be included in error 845.

Various components of apparatus 800 and a device or node implementing apparatus 800 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Figure 9:
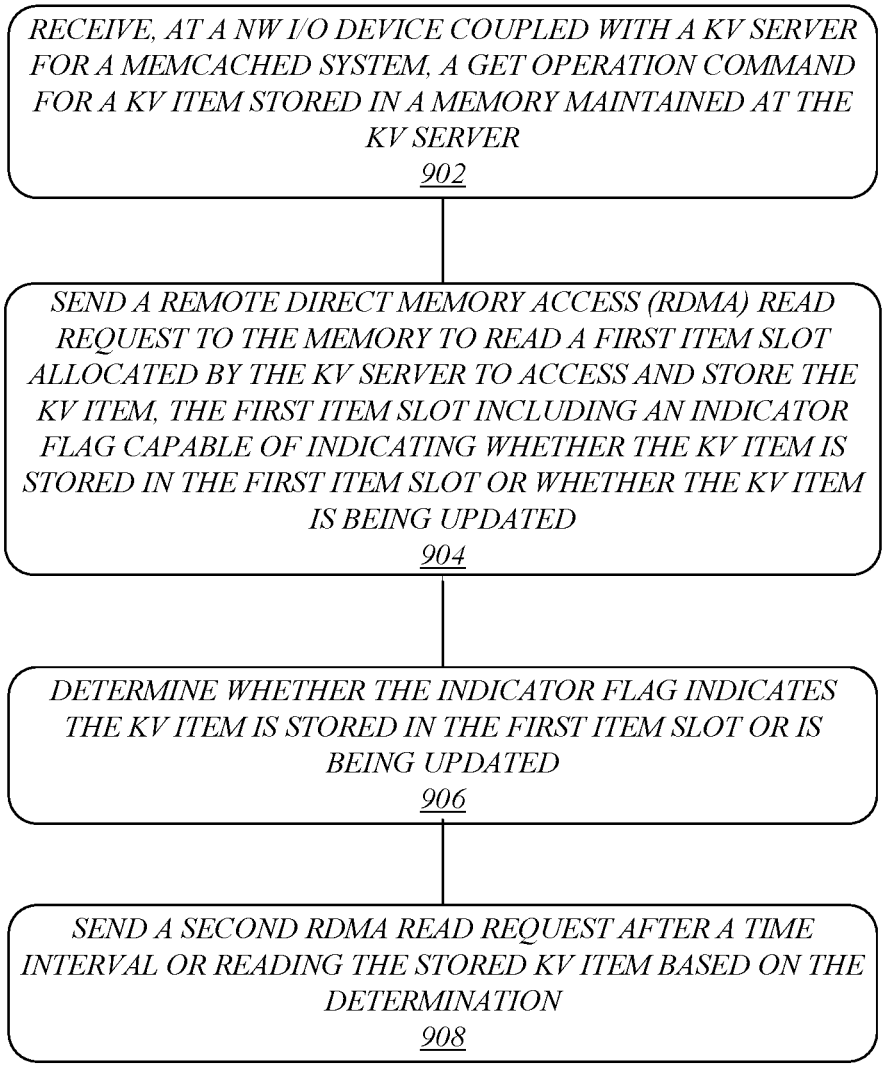
FIG. 9 illustrates an example of a second logic flow.

FIG. 9 illustrates an example of a second logic flow. As shown in FIG. 9 the second logic flow includes a logic flow 900. Logic flow 900 may be representative of some or all of the operations executed by one or more logic, features, or devices described herein, such as apparatus 800. More particularly, logic flow 900 may be implemented by at least receive component 822-1, request component 822-2, flag component 822-3, send component 822-4 or threshold component 822-5.

According to some examples, logic flow 900 at block 902 may receive, at a NW I/O device coupled with a KV server for a memcached system, a GET operation command for a KV item stored in a memory maintained at the KV server. For these examples, receive component 822-1 may receive the GET operation command.

In some examples, logic flow 900 at block 904 may send an RDMA read request to the memory to read a first item slot allocated by the KV server to access and store the KV item, the first item slot including an indicator flag capable of indicating whether the KV item is stored in the first item slot or whether the KV item is being updated. For these examples, request component 822-2 may send the RDMA request.

According to some examples, logic flow 900 at block 906 may determining whether the indicator flag indicates the KV item is stored in the first item slot or is being updated. For these examples, flag component 822-3 may make the determination.

In some examples, logic flow 900 at block 908 may send a second RDMA read request after a time interval or reading the stored KV item based on the determination. For these examples, request component 822-3 may send the second RDMA request responsive to an expiring timer that was set to expire after the time interval.

FIG. 10 illustrates an example of a second storage medium. As shown in FIG. 10, the second storage medium includes a storage medium 1000. The storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
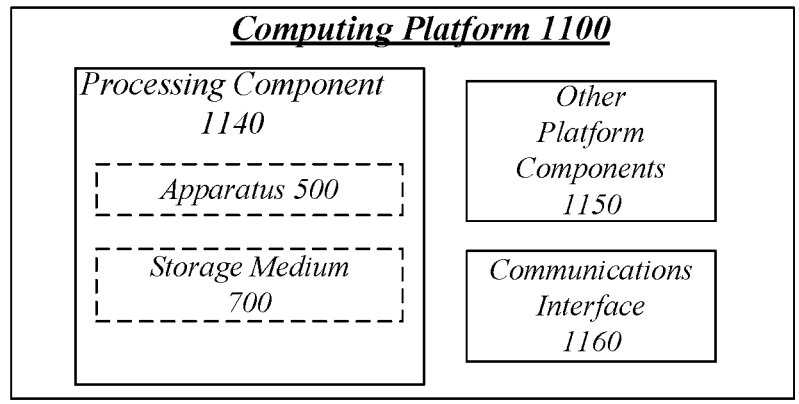
FIG. 11 illustrates an example computing platform.

FIG. 11 illustrates an example computing platform 1100. In some examples, as shown in FIG. 11, computing platform 1100 may include a processing component 1140, other platform components 1150 or a communications interface 1160. According to some examples, computing platform 1100 may be a KV server for a memcached system.

According to some examples, processing component 1140 may execute processing operations or logic for apparatus 500 and/or storage medium 700. Processing component 1140 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1150 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1160 may include logic and/or features to support a communication interface. For these examples, communications interface 1160 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification. Network communications may also occur according to such industry standards such as one or more standards or specifications associated with Infiniband™ specifications including Infiniband Architecture Specification, Volume 1, Release 1.2.1, published in November 2007.

As mentioned above computing platform 1100 may be implemented in a KV server. Accordingly, functions and/or specific configurations of computing platform 1100 described herein, may be included or omitted in various embodiments of computing platform 1100, as suitably desired for a server or client computing device.

The components and features of computing platform 1100 may be implemented using any combination of discrete circuitry, application specific integrated circuits (ASICs), logic gates and/or single chip architectures. Further, the features of computing platform 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Figure 12:
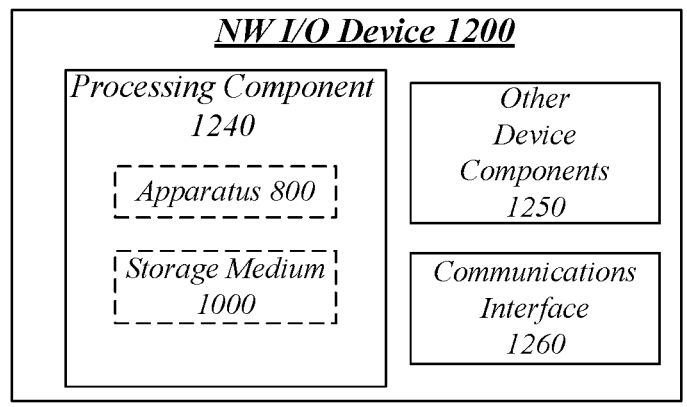
FIG. 12 illustrates an example network input/output device.

FIG. 12 illustrates an example NW I/O device 1200. In some examples, as shown in FIG. 12, NW I/O device 1200 may include a processing component 1240, other platform components 1250 or a communications interface 1260.

According to some examples, NW I/O device 1200 may be implemented in a NW I/O device (e.g., NW interface card (NIC) coupled with a KV server for a memcached system as mentioned above.

According to some examples, processing component 1240 may execute processing operations or logic for apparatus 800 and/or storage medium 1000. Processing component 1240 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other controller components 1250 may include common computing elements, such as one or more processors, multi-core processors, co-processors, memory units, interfaces, oscillators, timing devices, and so forth. Examples of memory units may include without limitation various types of computer readable and machine readable storage media in the form of one or more higher speed memory units, such as ROM, RAM, DRAM, DDRAM, SDRAM, SRAM, PROM, EPROM, EEPROM, flash memory or any other type of storage media suitable for storing information.

In some examples, communications interface 1260 may include logic and/or features to support a communication interface. For these examples, communications interface 1260 may include one or more communication interfaces that operate according to various communication protocols or standards to communicate over communication links or channels. Communications may occur via use of communication protocols or standards described in one or more industry standards (including progenies and variants) such as those associated with the PCI Express specification, the SMBus specification, Ethernet standards such as IEEE 802.3, OpenFlow specifications, the Infiniband Architecture Specification or RDMA protocols based, at least in part, on industry standards such as the Internet Wide Area RDMA protocol (iWARP), Infiniband (IB) protocol, Ethernet protocol, Transmission Control Protocol/Internet Protocol (TCP/IP) protocol and/or RDMA over Converged Ethernet (RoCE) protocol.

The components and features of NW I/O device 1200 may be implemented using any combination of discrete circuitry, application specific integrated circuits (ASICs), logic gates and/or single chip architectures. Further, the features of NW I/O device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example NW I/O device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus at a KV server for a memcached system may include circuitry and a receive component for execution by the circuitry to receive an operation command for storing a KV item to a memory maintained at the KV server. The apparatus may also include an allocation component for execution by the circuitry to allocate one or more item slots from the memory to access and store the KV item. A first item slot of the one or more item slots may include an indicator flag capable of indicating whether the KV item is stored in the first item slot or whether the KV item is being updated. The apparatus may also include a flag component for execution by the circuitry to set the indicator flag to indicate whether the KV item is stored in the first item slot.

Example 2

The apparatus of example 1, the first item slot may have a size equal to 64 bytes.

Example 3

The apparatus of example 2, the flag component may set the indicator flag to indicate the KV item is stored in the first item slot based on the indicator flag and the KV item having a size no larger than 64 bytes. The apparatus may also include a store component for execution by the circuitry to cause the indicator flag and the KV item to be stored in the first item slot.

Example 4

The apparatus of example 2, the flag component may set the indicator flag to indicate the KV item is stored in one or more additional item slots from among the allocated one or more item slots based on the indicator flag and the KV item having a size larger than 64 bytes. The apparatus may also include a store component for execution by the circuitry to cause the indicator flag and a memory pointer to the one or more additional item slots to be stored in the first item slot and to cause the KV item to be stored in the one or more additional item slots.

Example 5

The apparatus of example 1, the receive component may receive an operation command to update the KV item. The flag component may then set the indicator flag to indicate the KV item is being updated. The apparatus may also include an update component for execution by the circuitry to cause the KV item in the allocated one or more item slots to be updated. The flag component may then set the indicator flag to indicate whether the updated KV item is stored in the first item slot.

Example 6

The apparatus of 5, the first item slot may have a size equal to 64 bytes.

Example 7

The apparatus of example 6, the flag component may set the indicator flag to indicate the updated KV item is stored in the first item slot based on the indicator flag and the updated KV item having a size no larger than 64 bytes. The apparatus may also include a store component for execution by the circuitry to cause the indicator flag and the updated KV item to be stored in the first item slot.

Example 8

The apparatus of example 2, the flag component may set the indicator flag to indicate the updated KV item is stored in one or more additional item slots from among the allocated one or more item slots based on the indicator flag and the updated KV item having a size larger than 64 bytes. The apparatus may also include a store component for execution by the circuitry to cause the indicator flag and a memory pointer to the one or more additional item slots to be stored in the first item slot and to cause the updated KV item to be stored in the one or more additional item slots.

Example 9

The apparatus of example 1, the KV item may include data for at least a portion of a database-driven website.

Example 10

The apparatus of example 1 may also include a digital display coupled to the circuitry to present a user interface view.

Example 11

An example method may include receiving, at a KV server for a memcached system, an operation command for storing a KV item to a memory maintained at the KV server. The method may also include allocating one or more item slots from the memory to access and store the KV item. A first item slot of the one or more item slots may include an indicator flag capable of indicating whether the KV item is stored in the first item slot or whether the KV item is being updated. The method may also include setting the indicator flag to indicate whether the KV item is stored in the first item slot.

Example 12

The method of example 11, the first item slot may have a size equal to 64 bytes.

Example 13

The method of example 12, setting the indicator flag to indicate the KV item is stored in the first item slot based on the indicator flag and the KV item having a size no larger than 64 bytes.

Example 14

The method of example 12, setting the indicator flag to indicate the KV item is stored in one or more additional item slots from among the allocated one or more item slots based on the indicator flag and the KV item having a size larger than 64 bytes.

Example 15

The method of example 14, the first item slot may include the indicator flag and a memory pointer to the one or more additional item slots from among the allocated one or more item slots, the memory pointer used to locate and read the KV item from the memory.

Example 16

The method of example 11 may also include receiving an operation command to update the KV item, setting the indicator flag to indicate the KV item is being updated, updating the KV item in the allocated one or more item slots and setting the indicator flag to indicate whether the updated KV item is stored in the first item slot.

Example 17

The method of example 16, the first item slot may have a size equal to 64 bytes.

Example 18

The method of example 17, setting the indicator flag to indicate the updated KV item is stored in the first item slot based on the indicator flag and the updated KV item having a size no larger than 64 bytes.

Example 19

The method of example 17, setting the indicator flag to indicate the updated KV item is stored in one or more additional item slots from among the allocated one or more item slots based on the indicator flag and the updated KV item having a size larger than 64 bytes.

Example 20

The method of example 19, the first item slot may include the indicator flag and a memory pointer to the one or more additional item slots from among the allocated one or more item slots, the memory pointer used to locate and read the updated KV item from the memory.

Example 21

The method of example 11, the KV item may include data for at least a portion of a database-driven website.

Example 22

The method of example 11, the memory may be random access memory.

Example 23

An example at least one machine readable medium may include a plurality of instructions that in response to being executed by system at a server may cause the system to carry out a method according to any one of examples 11 to 22.

Example 24

An apparatus may include means for performing the methods of any one of examples 11 to 22.

Example 25

An example at least one machine readable medium may include a plurality of instructions that in response to being executed by a KV server for a memcached system may cause the KV server to receive an operation command for storing a KV item to a memory maintained at the KV server. The instructions may also cause the KV server to allocate one or more item slots from the memory to access and store the KV item. A first item slot of the one or more item slots may include an indicator flag capable of indicating whether the KV item is stored in the first item slot or whether the KV item is being updated. The instructions may also cause the KV server to set the indicator flag to indicate whether the KV item is stored in the first item slot.

Example 26

The at least one machine readable medium of example 25, the first item slot may have a size equal to 64 bytes.

Example 27

The at least one machine readable medium of example 26, the instructions may further cause the KV server to set the indicator flag to indicate the KV item is stored in the first item slot based on the indicator flag and the KV item having a size no larger than 64 bytes.

Example 28

The at least one machine readable medium of example 26, the instructions may further cause the KV server to set the indicator flag to indicate the KV item is stored in one or more additional item slots from among the allocated one or more item slots based on the indicator flag and the KV item having a size larger than 64 bytes.

Example 29

The at least one machine readable medium of example 28, the first item slot may include the indicator flag and a memory pointer to the one or more additional item slots from among the allocated one or more item slots, the memory pointer used to locate and read the KV item from the memory.

Example 30

The at least one machine readable medium of example 25, the instructions may further cause the KV server to receive an operation command to update the KV item, set the indicator flag to indicate the KV item is being updated, update the KV item in the allocated one or more item slots. The instructions may also cause the KV server to set the indicator flag to indicate whether the updated KV item is stored in the first item slot.

Example 31

The at least one machine readable medium of example 30, the first item slot may have a size equal to 64 bytes.

Example 32

The at least one machine readable medium of example 31, the instructions may further cause the KV server to set the indicator flag to indicate the updated KV item is stored in the first item slot based on the indicator flag and the updated KV item having a size no larger than 64 bytes.

Example 33

The at least one machine readable medium of example 31, the instructions may further cause the KV server to set the indicator flag to indicate the updated KV item is stored in one or more additional item slots from among the allocated one or more item slots based on the indicator flag and the updated KV item having a size larger than 64 bytes.

Example 34

The at least one machine readable medium of example 33, the first item slot may include the indicator flag and a memory pointer to the one or more additional item slots from among the allocated one or more item slots. The memory pointer may be used to locate and read the updated KV item from the memory.

Example 35

The at least one machine readable medium of example 25, the KV item may include data for at least a portion of a database-driven website.

Example 36

An example apparatus at a network input/output device coupled with a KV server for a memcached system may include circuitry. The apparatus may also include a receive component for execution by the circuitry to receive an operation command to get a KV item stored in a memory maintained at the KV server. The apparatus may also include a request component for execution by the circuitry to send an RDMA read request to the memory to read a first item slot allocated by the KV server to access and store the KV item. The first item slot may include an indicator flag capable of indicating whether the KV item is stored in the first item slot or whether the KV item is being updated. The apparatus may also include a flag component for execution by the circuitry to determine whether the indicator flag indicates the KV item is being updated. The request component may send another RDMA read request after a time interval or read the stored KV item based on the determination.

Example 37

The apparatus of example 36, the flag component may determine that the indicator flag indicates the KV item is stored in the first item slot. The request component may read the KV item from the first item slot. The apparatus may also include a send component for execution by the circuitry to send the KV item to a client computing device that was an originator of the operation command to get the KV item.

Example 38

The apparatus of example 36, the flag component may determine that the indicator flag indicates the KV item is stored in one or more additional item slots from among the allocated one or more item slots. The request component may read a memory pointer included in the first item slot to determine a location and size of the KV item stored in the one or more additional item slots and perform a DMA operation to read the KV item stored in the one or more additional item slots. The apparatus may also include a send component for execution by the circuitry to send the KV item to a client computing device that was an originator of the operation command to get the KV item.

Example 39

The apparatus of example 36, the request component may send the second RDMA read request after the time interval based on determining the indicator flag indicates the KV item is being updated. The flag component may determine whether the indicator flag still indicates the KV item is being updated or indicates whether an updated KV item is stored in the first item slot. The request component may then send a third RDMA read request after a second time interval or read the stored updated KV item based on the determination.

Example 40

The apparatus of example 39, the flag component may determine that the indicator flag indicates the updated KV item is stored in the first item slot. The request component may read the updated KV item from the first item slot. The apparatus may also include a send component for execution by the circuitry to send the updated KV item to a client computing device that was an originator of the operation command to get the KV item.

Example 41

The apparatus of example 39, the flag component may determine that the indicator flag indicates the updated KV item is stored in one or more additional item slots from among the allocated one or more item slots. The request component may read a memory pointer included in the first item slot to determine a location and size of the updated KV item stored in the one or more additional item slots and implement a DMA operation to read the updated KV item stored in the one or more additional item slots. The apparatus may also include a send component for execution by the circuitry to send the updated KV item to a client computing device that was an originator of the operation command to get the KV item.

Example 42

The apparatus of example 39, the request component to send the third RDMA read request after the second time interval. The flag component may determine whether the indicator flag still indicates the KV item is being updated or indicates whether the updated KV item is stored in the first item slot. The request component may then send additional RDMA read requests after respective additional time intervals based on the indicator flag being determined by the flag component as still indicating the KV item is being updated. The apparatus may also include a threshold component to compare a total number of additional RDMA read requests being sent to a threshold number. The apparatus may also include a send component for execution by the circuitry to send an error message to an originator of the operation command to get the KV item based on based on the total number exceeding the threshold number.

Example 43

The apparatus of example 36, the first item slot may have a size equal to 64 bytes.

Example 44

The apparatus of example 36, the KV item may include data for at least a portion of a database-driven website accessible to an originator of the operation command to get the KV item.

Example 45

The apparatus of example 36, comprising a digital display coupled to the circuitry to present a user interface view.

Example 46

An example method may include receiving, at a network input/output device coupled with a KV server for a memcached system, an operation command to get a KV item stored in a memory maintained at the KV server. The method may also include sending an RDMA read request to the memory to read a first item slot allocated by the KV server to access and store the KV item. The first item slot may include an indicator flag capable of indicating whether the KV item is stored in the first item slot or whether the KV item is being updated. The method may also include determining whether the indicator flag indicates the KV item is stored in the first item slot or is being updated and sending a second RDMA read request after a time interval or reading the stored KV item based on the determination.

Example 47

The method of example 46, determining that the indicator flag indicates the KV item is stored in the first item slot, reading the KV item from the first item slot and sending the KV item to a client computing device that was an originator of the operation command to get the KV item.

Example 48

The method of example 46 may also include determining that the indicator flag indicates the KV item is stored in one or more additional item slots from among the allocated one or more item slots. The method may also reading a memory pointer included in the first item slot to determine a location and size of the KV item stored in the one or more additional item slots. The method may also include performing a DMA operation to read the KV item stored in the one or more additional item slots. The method may also include sending the KV item to a client computing device that was an originator of the operation command to get the KV item.

Example 49

The method of example 48 may also include sending the second RDMA read request after the time interval based on determining the indicator flag indicates the KV item is being updated. The method may also include determining whether the indicator flag still indicates the KV item is being updated or indicates whether an updated KV item is stored in the first item slot. The method may also include sending a third RDMA read request after a second time interval or reading the stored updated KV item based on the determination.

Example 50

The method of example 49 may also include determining that the indicator flag indicates the updated KV item is stored in the first item slot. The method may also include reading the updated KV item from the first item slot and sending the updated KV item to a client computing device that was an originator of the operation command to get the KV item.

Example 51

The method of example 49, may also include determining that the indicator flag indicates the updated KV item is stored in one or more additional item slots from among the allocated one or more item slots. The method may also include reading a memory pointer included in the first item slot to determine a location and size of the updated KV item stored in the one or more additional item slots. The method may also include performing a DMA operation to read the updated KV item stored in the one or more additional item slots. The method may also include sending the updated KV item to a client computing device that was an originator of the operation command to get the KV item.

Example 52

The method of example 49, may also include sending the third RDMA read request after the second time interval. The method may also include determining whether the indicator flag still indicates the KV item is being updated or indicates whether the updated KV item is stored in the first item slot. The method may also include sending additional RDMA read requests after respective additional time intervals based on the indicator flag still indicating the KV item is being updated. The method may also include sending an error message to an originator of the operation command to get the KV item based on a total number of RDMA read requests being sent exceeding a threshold number and the indicator flag being determined to still indicate the KV item is being updated following each RDMA read request.

Example 53

The method of example 46, the first item slot may have a size equal to 64 bytes.

Example 54

The method of example 46, the KV item may include data for at least a portion of a database-driven website accessible to an originator of the operation command to get the KV item.

Example 55

An example at least one machine readable medium may include a plurality of instructions that in response to being executed by system at a server may cause the system to carry out a method according to any one of examples 46 to 54.

Example 56

An example apparatus may include means for performing the methods of any one of examples 46 to 54.

Example 57

An example at least one machine readable medium may include a plurality of instructions that in response to being executed by a system at a network input/output device coupled with a KV server for a memcached system may cause the system to receive an operation command to get a KV item stored in a memory maintained at the KV server. The instructions may also cause the system to send an RDMA read request to the memory to read a first item slot allocated by the KV server to access and store the KV item, the first item slot including an indicator flag capable of indicating whether the KV item is stored in the first item slot or whether the KV item is being updated. The instructions may also cause the system to determine whether the indicator flag indicates the KV item is being updated. The instructions may also cause the system to send another RDMA read request after a time interval or reading the stored KV item based on the determination.

Example 58

The at least one machine readable medium of example 57, the instruction may further cause the system to determine that the indicator flag indicates the KV item is stored in the first item slot. The instructions may also cause the system to read the KV item from the first item slot. The instructions may also cause the system to send the KV item to a client computing device that was an originator of the operation command to get the KV item.

Example 59

The at least one machine readable medium of example 59, the instruction may further cause the system to determine that the indicator flag indicates the KV item is stored in one or more additional item slots from among the allocated one or more item slots. The instructions may also cause the system to read a memory pointer included in the first item slot to determine a location and size of the KV item stored in the one or more additional item slots. The instructions may also cause the system to perform a DMA operation to read the KV item stored in the one or more additional item slots. The instructions may also cause the system to send the KV item to a client computing device that was an originator of the operation command to get the KV item.

Example 60

The at least one machine readable medium of example 57, the instruction may further cause the system to send the second RDMA read request after the time interval based on determining the indicator flag indicates the KV item is being updated. The instructions may also cause the system to determine whether the indicator flag still indicates the KV item is being updated or indicates whether an updated KV item is stored in the first item slot. The instructions may also cause the system to send a third RDMA read request after a second time interval or reading the stored updated KV item based on the determination.

Example 61

The at least one machine readable medium of example 60, the instruction may further cause the system to determine that the indicator flag indicates the updated KV item is stored in the first item slot. The instructions may also cause the system to read the updated KV item from the first item slot. The instructions may also cause the system to send the updated KV item to a client computing device that was an originator of the operation command to get the KV item.

Example 62

The at least one machine readable medium of example 60, the instruction may further cause the system to determine that the indicator flag indicates the updated KV item is stored in one or more additional item slots from among the allocated one or more item slots. The instructions may also cause the system to read a memory pointer included in the first item slot to determine a location and size of the updated KV item stored in the one or more additional item slots. The instructions may also cause the system to perform a DMA operation to read the updated KV item stored in the one or more additional item slots. The instructions may also cause the system to send the updated KV item to a client computing device that was an originator of the operation command to get the KV item.

Example 63

The at least one machine readable medium of example 60, the instruction may further cause the system to send the third RDMA read request after the second time interval. The instructions may also cause the system to determine whether the indicator flag still indicates the KV item is being updated or indicates whether the updated KV item is stored in the first item slot. The instructions may also cause the system to send additional RDMA read requests after respective additional time intervals based on the indicator flag still indicating the KV item is being updated. The instructions may also cause the system to send an error message to an originator of the operation command to get the KV item based on a total number of RDMA read requests being sent exceeding a threshold number and the indicator flag being determined to still indicate the KV item is being updated following each RDMA read request.

Example 64

The at least one machine readable medium of example 57, the first item slot may have a size equal to 64 bytes.

Example 65

The at least one machine readable medium of example 57, the KV item may include data for at least a portion of a database-driven website accessible to an originator of the operation command to get the KV item.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. At least one non-transitory machine readable medium comprising a plurality of instructions that in response to being executed by a key-value (KV) server for a memcached system cause the KV server to:
   receive a first operation command for a KV item stored in a memory maintained at the KV server;
   determine, based on an indicator flag in a first item slot in the memory, that the KV item is being updated;
   receive a second operation command for the KV item;
   determine, based on the indicator flag, that the KV item is stored in the first item slot and not being updated; and
   process the second operation command for the KV item.

2. The at least one machine readable medium of claim 1, the first item slot having a size equal to 64 bytes, the machine readable medium comprising instructions that in response to being executed by the KV server cause the KV server to:
   determine that a timer exceeds a time interval prior to determining the KV item is stored in the first slot; and
   update a value of the indicator flag from a first value to a second value to reflect that the KV item has been updated and is stored in the first item slot, the second operation command processed based at least in part on the indicator flag having the second value and the timer exceeding the time interval.

3. The at least one machine readable medium of claim 2, the first and second operation commands comprising remote direct memory access (RDMA) commands, the first and second operation commands each comprising one of a get, a store, or an update command.

4. The at least one machine readable medium of claim 2, the instructions to further cause the KV server to set the indicator flag to a third value indicate the KV item is stored in one or more additional item slots in the memory based on the indicator flag and the KV item having a size larger than a predefined size.

5. The at least one machine readable medium of claim 4, comprising the first item slot including the indicator flag and a memory pointer to the one or more additional item slots in the memory, the memory pointer used to locate and read the KV item from the memory.

6. The at least one machine readable medium of claim 1, the instructions to further cause the KV server to:
receive a third operation command to update the KV item prior to receiving the first operation command;
set the indicator flag to indicate the KV item is being updated;
update the KV item in the first item slot; and
set the indicator flag to indicate that the updated KV item is stored in the first item slot.

7. The at least one machine readable medium of claim 6, the first item slot having a size equal to 64 bytes.

8. The at least one machine readable medium of claim 7, the instructions to further cause the KV server to set the indicator flag to indicate the updated KV item is stored in the first item slot based on the indicator flag and the updated KV item having a size no larger than 64 bytes.

9. The at least one machine readable medium of claim 7, the instructions to further cause the KV server to set the indicator flag to indicate the updated KV item is stored in one or more additional item slots in the memory based on the indicator flag and the updated KV item having a size larger than 64 bytes.

10. The at least one machine readable medium of claim 9, comprising the first item slot including the indicator flag and a memory pointer to the one or more additional item slots in the memory, the memory pointer used to locate and read the updated KV item from the memory.

11. The at least one machine readable medium of claim 1, the KV item comprising data for at least a portion of a database-driven website, the KV item allocated to the first item slot responsive to a remote direct memory access (RDMA) command specifying to store the KV item.

12. A method comprising:
receiving, at a key-value (KV) server for a memcached system, a first operation command for a KV item stored in a memory maintained at the KV server;
determining, based on an indicator flag in a first item slot in the memory, that the KV item is being updated;
receiving a second operation command for the KV item;
determining, based on the indicator flag, that the KV item is stored in the first item slot and not being updated; and
processing the second operation command for the KV item.

13. The method of claim 12, further comprising:
determining that a timer exceeds a time interval prior to determining the KV item is stored in the first slot; and
updating a value of the indicator flag from a first value to a second value to reflect that the KV item has been updated and is stored in the first item slot, the second operation command processed based at least in part on the indicator flag having the second value and the timer exceeding the time interval.

14. The method of claim 13, the first item slot having a size equal to 64 bytes, the method further comprising:
setting the indicator flag to a third value to indicate the KV item is stored in one or more additional item slots in the memory based on the indicator flag and the KV item having a size larger than 64 bytes, the first item slot including the indicator flag and a memory pointer to the one or more additional item slots in the memory, the memory pointer used to locate and read the KV item from the memory.

15. The method of claim 12, comprising:
receiving a third operation command to update the KV item prior to receiving the first operation command;
setting the indicator flag to indicate the KV item is being updated;
updating the KV item in the first item slot; and
setting the indicator flag to indicate that the updated KV item is stored in the first item slot.

16. The method of claim 15, the first item slot including the indicator flag and a memory pointer to the one or more additional item slots in the memory, the memory pointer used to locate and read the updated KV item from the memory.

17. An apparatus at a network input/output device coupled with a key-value (KV) server for a memcached system comprising:
circuitry;
instructions for execution by the circuitry to:
receive an operation command to get a KV item for a KV item stored in a memory maintained at the KV server;
send a remote direct memory access (RDMA) read request to the memory to read a first item slot allocated by the KV server to access and store the KV item, the first item slot including an indicator flag capable of indicating whether the KV item is stored in the first item slot or whether the KV item is being updated;
determine that the indicator flag indicates the KV item is being updated; and
send another RDMA read request after a time interval based on the determination.

18. The apparatus of claim 17, comprising instructions for execution by the circuitry to:
determine that the indicator flag indicates the updated KV item is stored in the first item slot;
read the updated KV item from the first item slot; and
send the updated KV item to a client computing device that was an originator of the operation command to get the KV item.

19. The apparatus of claim 17, comprising instructions for execution by the circuitry to:
determine that the indicator flag indicates the updated KV item is stored in one or more additional item slots in the memory;
read a memory pointer included in the first item slot to determine a location and size of the KV item stored in the one or more additional item slots and perform a direct memory access (DMA) operation to read the updated KV item stored in the one or more additional item slots; and
send the updated KV item to a client computing device that was an originator of the operation command to get the KV item.

20. The apparatus of claim 17, comprising instructions for execution by the circuitry to:

determine whether the indicator flag still indicates the KV item is being updated or indicates whether the updated KV item is stored in the first item slot; and send a third RDMA read request after a second time interval or read the stored updated KV item based on the determination.

21. The apparatus of claim 20, comprising instructions for execution by the circuitry to:

determine that the indicator flag indicates the updated KV item is stored in the first item slot;

read the updated KV item from the first item slot; and send the updated KV item to a client computing device that was an originator of the operation command to get the KV item.

22. The apparatus of claim 20, comprising instructions for execution by the circuitry to:

determine that the indicator flag indicates the updated KV item is stored in one or more additional item slots in the memory;

read a memory pointer included in the first item slot to determine a location and size of the updated KV item stored in the one or more additional item slots in the memory and implement a direct memory access (DMA) operation to read the updated KV item stored in the one or more additional item slots; and send the updated KV item to a client computing device that was an originator of the operation command to get the KV item.

23. The apparatus of claim 20, comprising instructions for execution by the circuitry to:

send the third RDMA read request after the second time interval;

determine whether the indicator flag still indicates the KV item is being updated or indicates whether the updated KV item is stored in the first item slot;

send additional RDMA read requests after respective additional time intervals based on the indicator flag being determined by the flag component as still indicating the KV item is being updated;

compare a total number of additional RDMA read requests being sent to a threshold number; and send an error message to an originator of the operation command to get the KV item based on based on the total number exceeding the threshold number.

24. The apparatus of claim 17, comprising a digital display coupled to the circuitry to present a user interface view.

25. At least one non-transitory machine readable medium comprising a plurality of instructions that in response to being executed by a system at a network input/output device coupled with a key-value (KV) server for a memcached system cause the system to:

receive an operation command to get a KV item stored in a memory maintained at the KV server;

send a remote direct memory access (RDMA) read request to the memory to read a first item slot allocated by the KV server to store the KV item, the first item slot including an indicator flag capable of indicating whether the KV item is stored in the first item slot or whether the KV item is being updated;

determine that the indicator flag indicates the KV item is being updated; and send another RDMA read request after a time interval based on the determination.

26. The at least one machine readable medium of claim 25, the instruction to further cause the system to:

responsive to the another RDMA read request, determine that the indicator flag indicates the updated KV item is stored in the first item slot;

read the updated KV item from the first item slot; and send the updated KV item to a client computing device that was an originator of the operation command to get the KV item.

27. The at least one machine readable medium of claim 26, the instruction to further cause the system to:

determine that the indicator flag indicates the updated KV item is stored in one or more additional item slots in the memory;

read a memory pointer included in the first item slot to determine a location and size of the updated KV item stored in the one or more additional item slots;

perform a direct memory access (DMA) operation to read the updated KV item stored in the one or more additional item slots; and send the updated KV item to a client computing device that was an originator of the operation command to get the KV item.

28. The at least one machine readable medium of claim 25, the first item slot having a size equal to 64 bytes.

29. The at least one machine readable medium of claim 25, the KV item comprising data for at least a portion of a database-driven website accessible to an originator of the operation command to get the KV item.

* * * * *